«12» United States Patent
Anttila et al.

(10) Patent No.: US 7,910,079 B2
(45) Date of Patent: Mar. 22, 2011

(54) METHOD AND AN APPARATUS FOR REMOVING CARBON DIOXIDE FROM SULPHUR DIOXIDE CONTAINING FLUE GASES

(75) Inventors: Mikko Anttila, Tampere (FI); Risto Hämäläinen, Tampere (FI); Seppo Tuominiemi, Pirkkala (FI)

(73) Assignee: Metso Power Oy, Tampere (FI)

( * ) Notice: Subject to any disclaimer, the term of this patent is extended or adjusted under 35 U.S.C. 154(b) by 274 days.

(21) Appl. No.: 11/451,502

(22) Filed: Jun. 13, 2006

(65) Prior Publication Data

US 2006/0286011 A1 Dec. 21, 2006

(30) Foreign Application Priority Data

Jun. 15, 2005 (FI) .................................... 20055313

(51) Int. Cl.
*B01D 53/14* (2006.01)
*B01D 53/48* (2006.01)

(52) U.S. Cl. ........................ 423/232; 423/220

(58) Field of Classification Search ........................ None
See application file for complete search history.

(56) References Cited

U.S. PATENT DOCUMENTS

| 4,201,755 A | * | 5/1980 | Nofal ........................ 423/244.08 |
| 4,271,132 A |  | 6/1981 | Eickmeyer |
| 4,416,767 A | * | 11/1983 | Jordan ........................ 208/262.1 |
| 4,510,124 A |  | 4/1985 | Sears et al. |
| 4,681,045 A | * | 7/1987 | Dvirka et al. ................ 110/345 |
| 5,433,925 A | * | 7/1995 | McCord et al. ............... 422/168 |
| 6,399,030 B1 |  | 6/2002 | Nolan |
| 2004/0253159 A1 |  | 12/2004 | Hakka et al. |
| 2006/0185516 A1 |  | 8/2006 | Moriyama |

FOREIGN PATENT DOCUMENTS

| DE | 3025214 A1 | 2/1982 |
| JP | 3038219 A | 2/1991 |
| JP | 04346816 A | 12/1992 |
| JP | 05111614 A | 5/1993 |
| JP | 06099026 A | 4/1994 |
| WO | WO 9507750 A1 | 3/1995 |
| WO | WO 2004/113226 | * 12/2004 |
| WO | WO 2005/072851 A1 | 8/2005 |

OTHER PUBLICATIONS

PCT/ISA/210—International Search Report.
PCT/ISA/237—Written Opinion of the International Searching Authority.
European Search Report issued in application No. EP 06 39 7014.
Finnish Search Report issued in application No. 20055313.

* cited by examiner

*Primary Examiner* — Melvin C Mayes
*Assistant Examiner* — Sheng Han
(74) *Attorney, Agent, or Firm* — Venable LLP; Eric J. Franklin

(57) ABSTRACT

A method and an apparatus for removing carbon dioxide ($CO_2$) from sulphur dioxide containing ($SO_2$) flue gases, wherein the flue gases are washed with washing solution in a scrubber, which comprises at least two washing stages. In the first washing stage the flue gases are washed for removing the sulphur dioxide in the flue gases and after that in the second washing stage for removing carbon dioxide ($CO_2$). Sodium carbonate solution ($Na_2CO_3$) is used as washing solution in both the first and the second washing stages.

11 Claims, 2 Drawing Sheets

METHOD AND AN APPARATUS FOR REMOVING CARBON DIOXIDE FROM SULPHUR DIOXIDE CONTAINING FLUE GASES

CROSS-REFERENCE TO RELATED APPLICATIONS

This application claims priority under 35 USC §119 to Finnish Patent Application No. 20055313 filed on Jun. 15, 2005.

FIELD OF THE INVENTION

The invention relates to a method for removing carbon dioxide from sulphur dioxide containing flue gases. The invention also relates to an apparatus for implementing the aforementioned method.

BACKGROUND OF THE INVENTION

The flue gases of a boiler include various gaseous impurities as a result of combustion, such as sulphur and nitrogen oxides and carbon dioxide. The present environmental protection regulations require that flue gases are cleaned and impurities are removed from them prior to releasing flue gases into the environment from a combustion plant. For this purpose, there are several cleaning methods for flue gases that can be selected, for example dry, semidry and wet methods.

In wet cleaning methods flue gases are washed with a solution-like reagent, which reacts with the impurities in the flue gases. The reaction results in compounds, which are not harmful to the environment and which can be removed from the scrubber and taken, for example, to the waste storage area of the plant.

Carbon dioxide is one of the so-called greenhouse gases, which cause climate changes. Most of the carbon dioxide emissions are created in the combustion of fossil fuels. On the other hand, there are several usages of carbon dioxide: it is, for example, used in improving oil pumping and in the food industry. Removal and recovery of carbon dioxide from flue gases is therefore not only advantageous for the protection of environment, but also enables the commercial utilization of the recovered carbon dioxide.

Carbon dioxide can be removed from flue gases by washing them with a solution containing a reagent that reacts with carbon dioxide. The removal of carbon dioxide from flue gases is, however, difficult, which is due to the fact that the flue gases created in combustion plants, especially in industrial combustion processes, often contain sulphur oxides, which hinder the separation of carbon dioxide form flue gases. This problem has been attempted to be solved by washing the flue gases in two stages, i.e. by first removing the harmful sulphur oxides and after that the carbon dioxide.

This kind of methods are disclosed, for example, in U.S. Pat. No. 6,399,030 and US 2004/1253159. In the methods disclosed in these publications amine-based reagents are used as washing solution in different washing stages. A problem with the use of amine-based washing solutions is that the reaction products from the washing, which go to the waste treatment of the plant, are difficult to process. They cannot be taken to the plant's waste storage area nor to wastewater treatment, because they are harmful substances and they must be carefully prevented from getting into groundwater. Virtually the only disposal way for amine-based reaction products is combustion. In addition, amine-based reagents are expensive. If the flue gases to be cleaned contain a great deal of impurities, the use of amine-based washing solutions is not economical, because cleaning such flue gases uses a great deal of amine reagent.

From U.S. Pat. No. 4,510,124 it is known to remove carbon dioxide from sulphur dioxide containing flue gases by washing the flue gases in one stage with a potassium carbonate solution. The used washing solution is regenerated in order to create a usable washing solution, in which regeneration the carbon dioxide separated from the flue gases is used. The problem with this method is expressly the massive washing solution regeneration process it requires. In addition, the carbon dioxide recovered form the flue gases is used entirely in regenerating the washing solution, and none of it is left to be utilized elsewhere, for example for selling.

SUMMARY OF THE INVENTION

Thus, it is an aim of the present invention to provide a method for removing carbon dioxide from sulphur dioxide containing gases, which avoids the above-mentioned problems and by means of which it is possible to efficiently remove the carbon dioxide from sulphur-containing flue gases, and the removed carbon dioxide can be commercially utilized. Furthermore, it is an aim of the invention to provide an apparatus implementing the aforementioned method.

The invention is based on the idea that flue gases are washed in at least two sequential stages, where a washing solution containing the same active reagent as the washing solution is used, i.e. sodium carbonate solution. In the first washing stage of the scrubber, in the flow direction of the flue gases, the sulphur dioxide is washed from the flue gases. The purpose of the first washing stage is to remove sulphur dioxide disturbing the removal of carbon dioxide taking place in the second stage of the scrubber. At the same time, the flue gases are cleaned from sulphur dioxide that is harmful to the environment. The reaction of sulphur dioxide ($SO_2$) with sodium carbonate ($Na_2CO_3$) is as follows:

$$SO_2 + Na_2CO_3 \rightarrow Na_2SO_3 + CO_2 \qquad (1)$$

The sodium sulphite ($Na_2SO_3$) received from the first washing stage is oxidized later into sodium sulphate. Some sodium bisulphite ($Na_2HSO_3$) is also received as a result of the first washing stage, which is also oxidized later into sodium sulphate. Sodium sulphate can be removed from the process, for example, to the wastewater treatment of the plant or to practical use.

In the second washing stage of the scrubber the flue gases, from which sulphur dioxide has been removed, are washed again with sodium carbonate solution. In the second washing stage of the scrubber carbon dioxide reacts with the sodium carbonate in the washing solution and forms sodium bicarbonate ($NaHCO_3$) in accordance with the following formula:

$$CO_2 + Na_2CO_3 + H_2O \rightarrow 2NaHCO_3 \qquad (2)$$

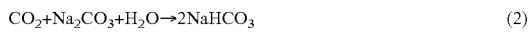

The sodium bicarbonate containing solution is led to a stripper, where it is processed by stripping with steam. As a result of the stripping, gaseous carbon dioxide and sodium carbonate solution are formed, which sodium carbonate solution is directed back to the first and second washing stages of the scrubber. The washing solution used in different stages of the scrubber are thus produced by regenerating the solution received form the scrubber and used in removing carbon dioxide. The washing solution used in the scrubber is also produced in the scrubber itself by supplying sodium hydroxide solution to the second washing stage, which solution reacts with the carbon dioxide in the flue gases and forms the sodium carbonate solution used as washing solution in accordance with the following formula:

$$2NaOH + CO_2 \rightarrow Na_2CO_3 + H_2O \quad (3)$$

An advantage of the invention is that by means of it carbon dioxide can be removed from the flue gases efficiently and simply. In addition, the sulphur dioxide can be removed from the flue gases. When sulphur dioxide is removed from the flue gases in their flow direction before the removal of carbon dioxide, the sulphur dioxide does not disturb the removal of carbon dioxide. Further, the carbon dioxide removed from the flue gases is recovered from the used washing solution, in which case the recovered gaseous carbon dioxide can be utilized elsewhere, for example, sold from the plant.

The invention also saves chemical expenses, because the washing solution used in removing both the carbon dioxide and the sulphur dioxide can be produced by regenerating the washing solution used in removing carbon dioxide, in which case the amount of additional chemical brought to the process can be kept small. The additional chemical, sodium hydroxide is also a cheap chemical and easily available. In addition, the sodium sulphite and sodium bisulphite formed from washing sulphur dioxide are harmless to the environment. As a result of their oxidation the sodium sulphate received as an end product is also harmless to the environment and can be taken either to the waste water treatment of the plant or to practical use.

An advantage of the invention is also the simplicity of its configuration. The parts of the apparatus required for implementing the invention are all easily commercially available, in which case the invention is easy and fast to implement. The apparatus according to the invention is also easy to install when retrofitting with an already operating scrubber.

DESCRIPTION OF THE DRAWINGS

In the following, the invention will be described in more detail with reference to the appended drawings, in which

In FIGS. 1 and 2, the same numerals refer to corresponding parts and they will not be explained separately later on, unless required by the illustration of the subject matter.

DETAILED DESCRIPTION OF THE INVENTION

In this description and in the claims the sodium carbonate solution refers to a solution, where the effective reagent is sodium carbonate. The solution may also include other components, which do not, however, substantially take part in the removal of sulphur dioxide or carbon dioxide according to the invention. Sodium bicarbonate solution, in turn, refers to a solution, which primarily includes sodium bicarbonate, but which may also include other components. The term line in this description refers to any pipe, duct or channel suitable for conveying a liquid or gaseous matter.

Figure 1:
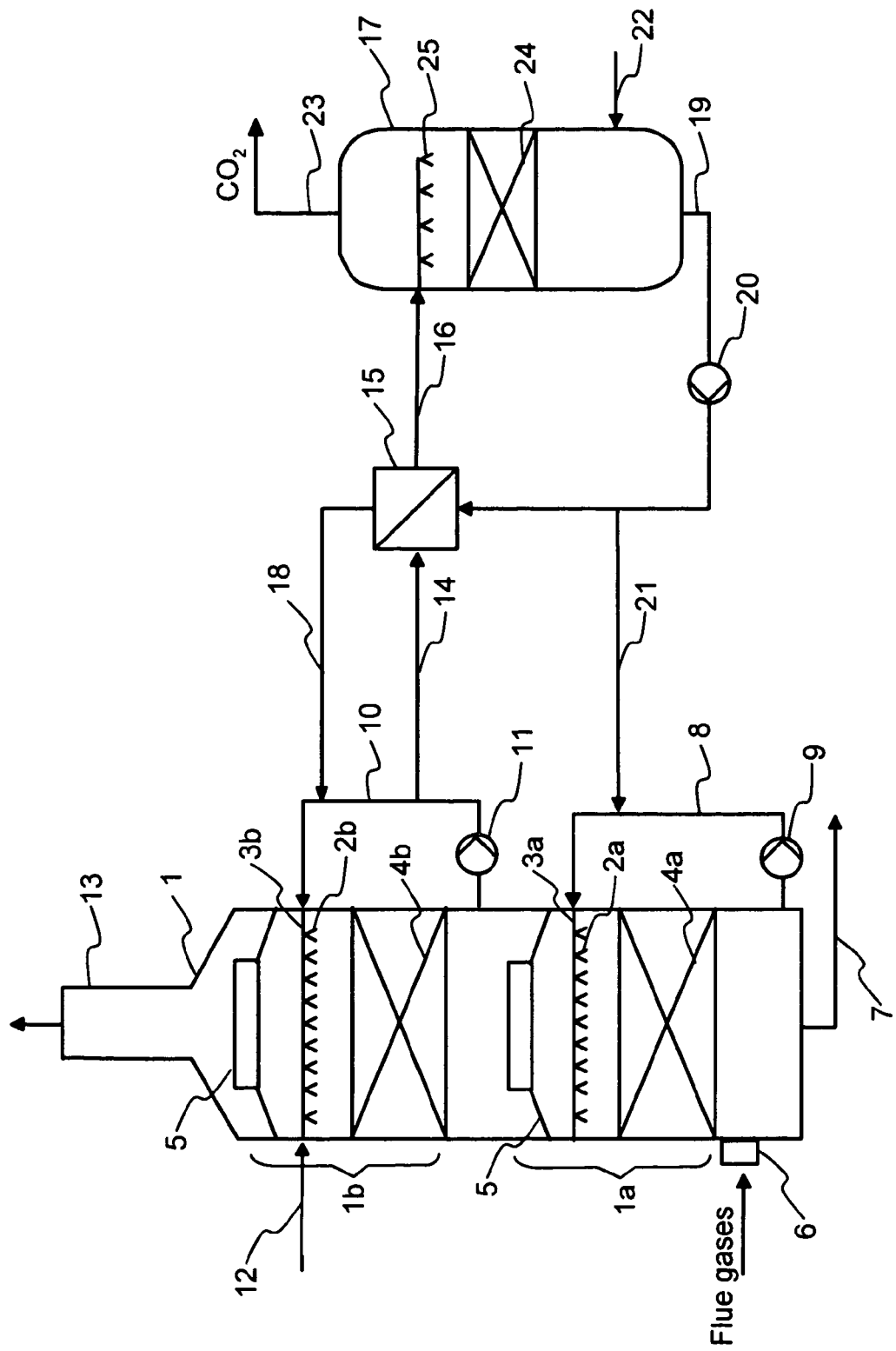
FIG. 1 is a schematic and greatly simplified side view of an apparatus according to the invention.

FIG. 1 is a schematic and a greatly simplified view of an apparatus according to the invention. The apparatus includes a flue gas scrubber 1, which has two washing stages, a first washing stage 1a and a second washing stage 1b. The washing stages include nozzles 2a and 2b distributing washing solution, pipes 3a and 3b distributing washing solution and connected to the nozzles, and packed beds 4a and 4b. There are several nozzles 2a and 2b in both washing stages and they are arranged at even intervals over the cross-sectional area of the scrubber so that they spray washing solution substantially evenly over the entire cross-sectional area of the scrubber.

The packed beds are placed before the nozzles in the flow direction of the flue gases. The first washing stage 1a is arranged in the flue gas scrubber immediately before the second washing stage 1b in the flow direction of the flue gases. It is also possible to form other washing stages in the flue gas scrubber 1, which stages are placed before the first washing stage or after the second washing stage in the flow direction of the flue gases. After both washing stages there are droplet separators 5 in the flue gas scrubber, which separate the droplets that have been swept along with the flue gases.

The flue gases are supplied to the flue gas scrubber 1 from its lower part, via duct 6. The duct 6 is placed before the first washing stage so that the flue gases discharged from the duct 6 to the flue gas scrubber are washed first in the first washing stage 1a of the scrubber. The flow direction of flue gases in the flue gas scrubber is upwards, from the bottom to the top. The flue gases are washed in the first washing stage 1a with sodium carbonate solution sprayed via nozzles 2a. The sodium carbonate ($Na_2CO_3$) reacts with the sulphur oxide ($SO_2$) in the flue gases and forms a sodium sulphite ($Na_2SO_3$) and sodium bisulphite ($Na_2HSO_3$) containing solution, which is removed from the scrubber via line 7. The sodium carbonate containing washing solution is recycled by means of the line 8 and a pump 9 arranged in it from the lower part of the first washing stage back to the nozzles 2a of the first washing stage.

When sulphur dioxide has been removed from the flue gases in the first washing stage 1a, they flow upwards in the scrubber to the second washing stage 1b. In the second washing stage carbon dioxide ($CO_2$) is removed from the flue gases by washing them with cooled sodium carbonate containing solution. Sodium carbonate solution is sprayed via the nozzles 2b of the second washing stage 1b. Also in the second washing stage 1b the sodium carbonate containing washing solution is recycled to the nozzles 2b, which recycling takes place by means of line 10 and a pump 11 arranged in it. Sodium carbonate reacts with the carbon dioxide in the flue gases thus forming sodium hydrogen carbonate solution ($NaHCO_3$). Sodium hydroxide solution (NaOH) is also led to the second washing stage 1b via line 12 and nozzles 2b to replace the sodium used in washing sulphur dioxide in the first washing stage. Sodium hydroxide solution reacts with the carbon dioxide in the flue gases and forms sodium carbonate solution used as washing solution. The cleaned flue gases are led up via a stack 13 arranged in the upper end of the scrubber.

The sodium bicarbonate containing solution received from the second stage 1b of the flue gas scrubber is led via line 14 to a heat exchanger 15 and further via line 16 to be processed in a stripper 17. In the heat exchanger 15 the sodium bicarbonate containing solution is heated, which improves the separation of carbon dioxide from the solution in the stripper. The purpose of stripping is to by means of heat and pressure form from the sodium bicarbonate solution the sodium carbonate solution and gaseous carbon dioxide, which sodium carbonate solution is to be used in the scrubber 1. The sodium bicarbonate solution is sprayed downwards via nozzles 25 arranged in the upper part of the stripper 17. There is a packed bed 24 below the nozzles, which improves the separation of carbon dioxide from the sodium bicarbonate solution. Carbon dioxide is stripped to a gas phase by means of hot steam. Steam is brought to the stripper via a line 22 connected to its lower part. The carbon dioxide freed in stripping is removed via a line 23 from the upper part of the stripper 17.

The purpose of the heat exchanger 15 is to raise the temperature of the sodium bicarbonate solution received from the second stage 1b of the flue gas scrubber before it is directed to the stripper 17. The heat exchanger 15 also cools the sodium carbonate solution received from the stripper 17, which cooled solution is led from the heat exchanger 15 via line 18 to act as the washing solution in the second stage 1b of the flue gas scrubber. The sodium carbonate solution received from the stripper is led to the heat exchanger 15 via a line 19. A pump 20 arranged in line 19 is utilized in transferring the solution.

The sodium carbonate solution received from the stripper is also led from line 19 via line 21 to the first washing stage 1a of the flue gas scrubber as a washing solution. In the embodiment of the figure, the recycling of the sodium carbonate solution to be used as washing solution from the stripper 17 back to the different washing stages of the flue gas scrubber is performed by leading the sodium carbonate solution to the first and second washing stages of the flue gas scrubber, to the lines 8 and 10 which recycle the washing solution in the first and second washing stages.

Figure 2:
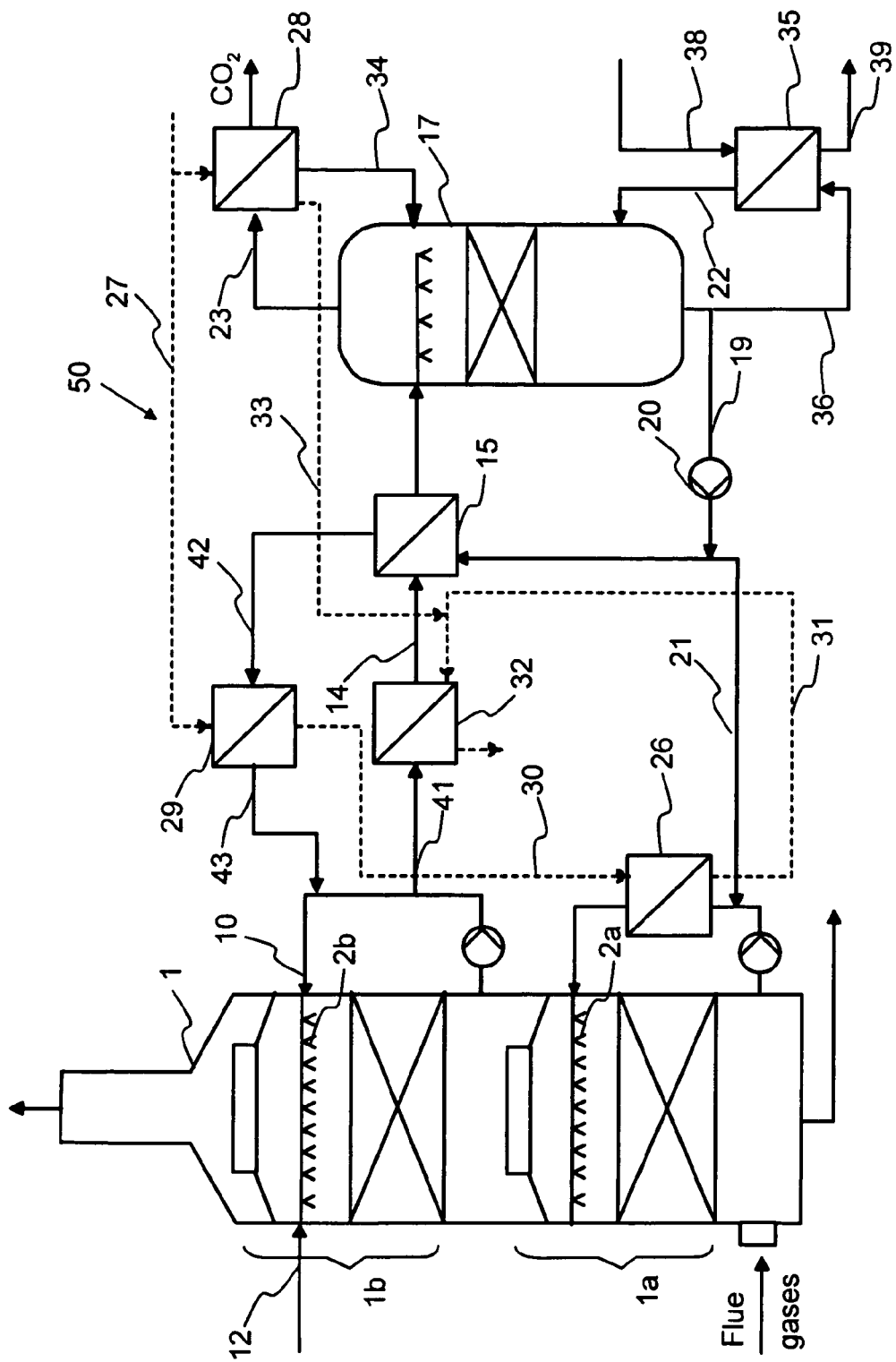
FIG. 2 shows the embodiment of the invention of FIG. 2 in more detail.

FIG. 2 shows the embodiment of the invention of FIG. 1 in more detail. FIG. 2 shows the heat exchangers necessary for the efficient operation of the invention, which cool or warm the solutions used in the process that run through them. A part of the heat exchangers utilize the external heat exchange medium circulation 50 of the process. The lines 27, 30, 31 and 33 conveying the heat exchange medium, which are a part of this heat exchange medium circulation, are shown with dashed lines in the figure. The heat exchangers that are a part of the external heat exchange medium circulation are marked with numbers 29, 26, 32 and 28. The use of these heat exchangers in the process does not affect the basic operation of the flue gas scrubber and the stripper.

As can be seen in FIG. 2, in the first washing stage 1a of the flue gas scrubber 1 the recycled sodium carbonate containing washing solution is led via the heat exchanger 26 to the nozzles 2a. In the heat, exchanger 26 the washing solution is cooled. Thus, the flue gases are washed with cooled washing solution in the first stage, which not only acts as a sulphur removing reagent, but also cools the flue gases before they are conveyed to the second washing stage. The flue gases are cooled to approximately 40° C. Cooling the flue gases improves the separation of carbon dioxide from them. Also in the second washing stage 1b it is advantageous to use cooled sodium carbonate solution. The use of cooled washing solution improves the absorption of carbon dioxide into the washing solution.

The solution used as the cooling medium of the heat exchanger 26 can be any liquid suitable for heat exchange, for example water. The heat exchange medium enters the apparatus via the heat exchange medium line 27, from where it is distributed to a heat exchanger 28 cooling the carbon dioxide received from the stripper 17, which is explained more in detail later, and a heat exchanger 29 cooling the sodium carbonate solution received from the stripper 17. The heat exchange medium entering the apparatus is thus cold and in the circulation it is first directed to those heat exchangers, whose task it is to cool the medium flows in the process. When cooling the medium flows, the heat exchange medium absorbs heat, i.e. it is heated and finally it can be used to warm a medium flow running through a certain heat exchanger.

From the heat exchanger 29 the cooling medium is directed via line 30 to the heat exchanger 26 cooling the washing solution circulating in the first washing stage. The hot medium that has absorbed heat from the heat exchanger is led via line 31 to the heat exchanger 32, where it heats the sodium bicarbonate containing solution received from the second washing stage 1b of the flue gas scrubber. Hot medium from the heat exchanger 28 is also directed to the heat exchanger 32 via line 33.

As can be seen in the figure, the sodium carbonate containing solution received from the second washing stage 1b of the scrubber is heated with two heat exchangers before it is led to the stripper 17. The sodium carbonate containing solution heated in the heat exchanger 32 is led via line 14 to the heat exchanger 15 and from there further via line 16 to the stripper 17.

The sodium carbonate solution received from the stripper 17 is, in turn, cooled with two heat exchangers before it is led to the second washing stage 1b of the scrubber. From the stripper the sodium carbonate solution is led first to the heat exchanger 15 and from there through line 42 to the heat exchanger 29 that is a part of the external heat exchange medium circulation of the process. From the heat exchanger 29 the sodium carbonate solution is directed via line 43 to the circulation line 10 supplying washing solution to the second washing stage of the scrubber.

The heat exchanger 28 is, as was mentioned earlier, a heat exchanger cooling the carbon dioxide containing gas received form the stripper 17. The cold cooling medium is led to the heat exchanger 28 from the cooling medium line 27. The condensate formed in cooling the carbon dioxide containing gas cools is taken back to the stripper 17 via line 34. The carbon dioxide containing gas is led out from the heat exchanger to be compressed later (not shown in the figure).

The heat required by the stripper 17, i.e. the steam used in this embodiment is formed of the sodium carbonate solution received from the stripper 17, which is evaporated in the heat exchanger 35. The sodium carbonate solution is directed to the heat exchanger 35 via line 36 and the steam formed in the heat exchanger is directed to the stripper via line 22. The heat needed for evaporating the sodium carbonate solution is brought to the heat exchanger, for example, as steam via line 38. The condensate forming in the heat exchanger 35 is removed via line 39.

For producing steam, it is also possible to use an evaporator instead of a heat exchanger 35. It is also possible to lead directly to the stripper steam received from a boiler, from a part of the process connected to it, or from elsewhere in the process plant, for example main steam.

The invention is not intended to be limited to the embodiments presented as examples above, but the invention is intended to be applied widely within the scope of the inventive idea as defined in the appended claims. The heat exchangers used in applying the invention can be any heat exchangers suitable for indirect heating/cooling.

The invention claimed is:

1. A method for removing carbon dioxide from sulphur dioxide containing flue gases, the method comprising:
    washing the flue gases with washing solution in a scrubber, the washing comprising subjecting the flue gases to two sequential washing stages, the two sequential washing stages comprising a first washing stage and subsequent a second washing stage, wherein the first washing stage comprises washing sulphur dioxide from the flue gases with sodium carbonate solution, wherein in the first washing stage the sodium carbonate solution reacts with the sulphur dioxide in the flue gases and forms a sodium sulphite and sodium bisulphite containing solution that is removed from the scrubber, and wherein the second washing stage comprises washing carbon dioxide from the flue gases, from which sulphur dioxide has been removed in the first washing stage, with sodium carbonate solution, thereby forming sodium bicarbonate solution which is treated separately from the sodium sulphite and sodium bisulphite containing solution and is fed from the scrubber to a stripper where the sodium bicarbonate solution is processed to form a solution containing sodium carbonate and carbon dioxide gas.

2. The method according to claim 1, wherein the sodium carbonate solution formed in the stripper is led to the first washing stage and the second washing stage of the scrubber.

3. The method according to claim 1, wherein the sodium bicarbonate solution is processed in the stripper with steam.

4. The method according to claim 1, wherein sodium hydroxide solution is led to the second washing stage in order to form sodium carbonate solution.

5. The method according to claim 1, wherein the sodium bicarbonate solution is heated with at least one heat exchanger before the sodium bicarbonate solution is led to the stripper.

6. The method according to claim 1, wherein the sodium bicarbonate solution is cooled with at least one heat exchanger before the sodium bicarbonate solution is led to the second washing stage.

7. The method according to claim 5, wherein an external heat exchange medium circulation is used for heating the sodium bicarbonate solution.

8. The method according to claim 6, wherein an external heat exchange medium circulation is used for cooling the sodium carbonate solution.

9. The method according to claim 5, wherein a heat exchange medium is used in heating the sodium carbonate solution, which medium has absorbed heat in at least one heat exchanger that is a part of the heat exchange medium circulation.

10. The method according to claim 1, wherein the carbon dioxide gas from the stripper is compressed.

11. The method according to claim 1, wherein sodium sulphite and sodium bisulphite in the sodium sulphite and sodium bisulphite containing solution removed from the scrubber are oxidized into sodium sulphate, which is removed from the process.

* * * * *